United States Patent
Leblans et al.

(10) Patent No.: US 7,446,323 B2
(45) Date of Patent: Nov. 4, 2008

(54) RADIATION IMAGE STORAGE PANEL SUITABLE FOR USE IN MAMMOGRAPHIC APPLICATIONS

(75) Inventors: Paul Leblans, Kontich (BE); Ilse Mans, Herenthout (BE); Jean-Pierre Tahon, Langdorp (BE); Ludo Neyens, Kontich (BE)

(73) Assignee: Agfa-Gevaert, Mortsel (BE)

( * ) Notice: Subject to any disclaimer, the term of this patent is extended or adjusted under 35 U.S.C. 154(b) by 121 days.

(21) Appl. No.: 11/511,923

(22) Filed: Aug. 29, 2006

(65) Prior Publication Data

US 2007/0075270 A1    Apr. 5, 2007

(30) Foreign Application Priority Data

Sep. 30, 2005    (EP) ................... 05109076

(51) Int. Cl.
*G03B 42/00* (2006.01)
(52) U.S. Cl. .................................. 250/484.4
(58) Field of Classification Search ............... 250/484.4
See application file for complete search history.

(56) References Cited

U.S. PATENT DOCUMENTS

| | | | | |
|---|---|---|---|---|
| 4,547,672 A | * | 10/1985 | Arakawa et al. | 250/483.1 |
| 5,534,191 A | | 7/1996 | Hasegawa et al. | 252/301.4 H |
| 5,877,504 A | * | 3/1999 | Yanagita et al. | 250/484.4 |
| 6,383,412 B1 | | 5/2002 | Hasegawa | 252/301.4 H |
| 6,531,073 B1 | | 3/2003 | Wakamatsu et al. | 252/301.4 H |
| 2003/0005552 A1 | | 1/2003 | Matsumoto | 23/300 |

OTHER PUBLICATIONS

European Search Report, EP 05109076, Apr. 27, 2006, Lehnert, not a publication.
Modeling Quantum Noise of Phosphors Used in Medical X-Ray Imaging Detectors, N. Kalivas et al., Nuclear Instruments and Methods in Physics Research A 430 (1999) 559-569.
Modeling Quantum and Structure Noise of Phosphors Used in Medical X-Ray Imaging Detectors, Kalivas et al., Nuclear Instruments and Methods in Physics Research A 490 (2002) 614-629.

* cited by examiner

*Primary Examiner*—Constantine Hannaher
(74) *Attorney, Agent, or Firm*—Joseph T. Guy; Nexsen Pruet, LLC

(57) ABSTRACT

In a photostimulable storage phosphor screen or panel wherein said screen comprises storage phosphor particles dispersed in a binder and wherein said particles have a particle size distribution having a $d_{99}$ which is not more than 15 μm, said $d_{99}$ expressing a grain size limit above which not more than 1% by weight of phosphor powder particles is present in said phosphor powder, its structure noise parameter $DQE2_{rel}$ exceeds a value of 0.70 and a ratio of $d_{99}$ (expressed in μm) and $DQE2_{rel}$ is not more than 25:1, wherein $DQE2_{rel}$ is the ratio of the DQE2 obtained at a dose of 22 mR to the DQE2 obtained at a dose of 3 mR, as expressed in formula (I)

$$DQE2rel = DQE2(22\ mR)/DQE2(3\ mR) \qquad (I)$$

which is representative for an amount of screen-structure noise produced by said screen or panel in the complete spatial frequency range.

3 Claims, 2 Drawing Sheets

RADIATION IMAGE STORAGE PANEL SUITABLE FOR USE IN MAMMOGRAPHIC APPLICATIONS

The entire contents of literatures cited in this specification are incorporated herein by reference.

FIELD OF THE INVENTION

The present invention relates to a photostimulable storage phosphor screen or panel comprising a powder phosphor layer, particularly suitable for use in mammographic applications.

BACKGROUND OF THE INVENTION

The replacement of X-ray screen/film systems by computed radiography (CR) started about 10 to 15 years ago. Until recently, the conversion was limited to general radiography. Now, the CR companies are introducing mammo CR as well. As is known in different X-ray imaging applications different X-spectra and different X-ray doses are used. Mammographic imaging in particular differs from other imaging applications, which are considered under the common name "general radiography".

As a consequence of differences in spectra and dose use of specific phosphor screens for mammography is required, that are quite different from the general radiography screens. As a further consequence other factors are responsible for image quality in mammography than in general radiography.

Typical X-ray exposure conditions in general radiography are the so-called RQA-5 conditions [IEC(6)1267:1994]. The spectrum is generated by an X-ray source having a tungsten anode at a 70 kVp setting. The spectrum is filtered by an internal and an external aluminum filter having a thickness of 2.5 mm and 21 mm respectively. RQA-5 exposure conditions correspond to an "Al half-value thickness" of 7.1 mm. The average energy of the X-ray quanta is about 55 keV.

For a typical general radiography dose of 0.3 mR the number of X-ray quanta to which the phosphor screen is exposed under RQA-5 conditions is $8.6 \, 10^4$ quanta/mm². The number of quanta absorbed by the phosphor screen is typically ca. $2.5 \, 10^4$ quanta/mm².

A typical mammo spectrum is generated by an X-ray source having a Mo anode at a 28 kVp setting. An internal Mo filter with a thickness of 0.03 mm is typically used. If the X-ray spectrum is additionally filtered by 42 mm of PMMA a typical spectrum is generated that reaches the phosphor plate in mammographic imaging. In this case, the average energy of the X-ray quanta is ca. 20 keV.

For a typical mammography dose of 10 mR the number of X-ray quanta to which the phosphor screen is exposed under the above described mammoconditions is: $4.7 \, 10^5$ quanta/mm² and the number of absorbed quanta is of the order of $3 \times 10^5$ to $4 \times 10^5$.

Hence, the number of quanta used to make an image is more than 10 times higher in mammography than in general radiography. As a consequence, quantum noise, due to fluctuations in the number of X-ray quanta absorbed per pixel is relatively large in general radiography and less important in mammography. In general radiography computed radiography (CR) quantum noise is the only important noise source, which means that signal-to-noise ratio is primarily determined by the X-ray absorption and the sensitivity of the phosphor screen. Analysis of noise components of various imaging plates, wherein CR system noise is classified in quantum noise and fixed noise, has e.g. been described in Med.Imaging 2004: Physics of Medical Imaging, p. 686, Proceedings of SPIE, Vol. 5368. Since quantum noise is smaller in mammography another noise source, screen-structure noise, has a significant contribution to the total noise in the image as well.

Therefore, contrary to what is the case in general radiography, screen-structure noise must be reduced to a minimum in order to have a good phosphor screen for mammographic imaging, i.e. the phosphor screen must be made as homogeneous as possible.

U.S. Pat. No. 6,383,412 relates to a rare earth element-activated, alkaline earth metal fluorohalide based stimulable phosphor, a rare earth element-activated, alkaline earth metal fluorohalide based stimulable phosphor having a tetradecahedral structure in particular, a process for preparing the phosphor, and a radiographic image conversion panel using the phosphor. That phosphor has a grain size median diameter (Dm) of 1 to 10 µm, a standard deviation on the average grain size of 50% or less for grains having a grain aspect ratio within the range of from 1.0 to 2.0. An object attained therewith was to provide a rare earth element-activated, alkaline earth metal fluorohalide based stimulable phosphor capable of producing high-quality images having a very high sharpness and exhibiting other excellent emission characteristics, high sensitivity and erasure characteristics in particular, when used in radiographic image recording and reproduction.

Apart from those image quality properties, noise measurements have been performed e.g. in "Nuclear Instruments and Methods in Physics Research Section A: Accelerators, Spectrometers, Detectors and Associated Equipment", Vol. 430, issues 2-3, July 1999, p. 559-569. Therein the phosphor screens are brought in close contact with a film (AGFA Scopix LT2B) sensitive to their emission spectrum (red). The above configuration was irradiated with a mammography X-ray unit (molybdenum target tube and 30 kVp X-ray spectrum filtered by a 51 mm plexiglass). The exposure was 6.32 mR. This value is among the lowest values reported for NPS measurements in 30 kVp as taught in Med. Phys. 12 (1985), p. 32; Med. Phys. 19 (1992), p. 449 and Radiology 145 (1982), p. 815. Furthermore it has been said therein that as a preferred technique the sedimentation technique, used for screen preparation, results in uniform distribution of phosphor grains. Contribution of the screen structure noise to NPS for the above mentioned exposure value can thus be considered small as compared to the quantum noise pattern. Structure noise properties of granular phosphors used in X-ray imaging detectors have further been studied in terms of a noise transfer function, NTF as disclosed in "Nuclear Instruments and Methods in Physics Research Section A: Accelerators, Spectrometers, Detectors and Associated Equipment" Vol. 490, issue 3 (2002), p. 614-629. That study has been performed in high-exposure conditions where the contribution of structure noise to total screen noise is considerable. An analytical model, based on the cascaded linear systems methodology presented in the literature, has been developed, wherein that model takes into account quantum noise and structure noise. Furthermore, it considers the effect of the K X-rays reabsorption on the phosphor material and the effect of screen thickness on the NTF. The model was validated against experimental results obtained by a set of $Zn_2SiO_4$:Mn phosphor screens prepared by sedimentation. The model may be used to evaluate the effect of screen thickness and the effect of the characteristic X-rays on NTF in high-exposure conditions where structure noise is considerable.

The effect of screen thickness is particularly important in high-exposure conditions, where the screen structure noise is dominant. Screen structure noise is attributed to fluctuations of the absorbed X-ray quanta due to the inhomogeneities in the phosphor coating as has been described by Barnes in Med. Phys. 9(1982), p. 656. This component is negligible in quantum-limited (i.e. low-exposure) conditions, but in higher exposure conditions it should be taken into consideration. Screen noise is evaluated in terms of either NPS (also called Wiener spectrum), or Noise Transfer Function, NTF Med. Phys. 17 (1990), p. 894. Since quantum and structure noise are statistically independent and uncorrelated, total screen NPS equals the sum of the corresponding NPS of quantum noise and screen-structure noise.

It is moreover general knowledge that sharper images with less noise are obtained with phosphor particles of smaller mean or average particle size, but otherwise, it is well-known that light emission efficiency declines with decreasing particle size. Thus, the optimum mean particle size for a given application is a compromise between imaging speed and image sharpness desired. Until now preferred average grain sizes of the phosphor particles are in the range of 2 to 30 μm and more preferably in the range of 2 to 20 μm, in particular for BaFBr:Eu type phosphors.

Dedicated storage phosphor screens are thus required for mammographic applications, more particularly as a higher sharpness is needed. Moreover since the number of X-ray quanta contributing to the image is higher than in general radiography, quantum noise is reduced and screen-structure noise has a significant contribution. Hence, screens must be developed with a higher homogeneity, i.e. the pixel-to-pixel sensitivity fluctuation should be reduced as much as possible.

SUMMARY OF THE INVENTION

Accordingly, it is a main object of the present invention to provide mammographic screens that lead to only a small amount of screen-structure noise.

It is another object of the present invention to obtain a phosphor screen exhibiting a very high sharpness and excellent emission characteristics, i.e. giving a low amount of quantum noise when used in radiographic image recording and reproduction with the thus obtained phosphor, coated in a radiographic image storage panel making use of that phosphor.

Still another object of the present invention is to provide a new process for preparing a rare earth element-activated, alkaline earth metal fluorohalide based stimulable phosphor, which process is highly capable of controlling the grain size, and grain size distribution of the grains of the stimulable phosphor.

In particular, it is an object of the present invention to provide a novel process for preparing a rare earth element-activated, alkaline earth metal fluorohalide based stimulable phosphor capable of providing high-quality images exhibiting a very high sharpness together with good sensitivity and low screen structure noise, when utilized in a radiographic image conversion panel, and equipment in which the process is performed.

The above-mentioned advantageous effects have been realized by providing a storage phosphor panel having the specific features set out in claim 1. Specific features for preferred embodiments of the invention are set out in the dependent claims. Further advantages and embodiments of the present invention will become apparent from the following description and drawings.

DEFINITIONS

DQE(ν) expresses the amount of screen-structure noise at ν lp/mm, as being representative for the amount of screen-structure noise in the complete spatial frequency range and is calculated from data measured in MTF and Wiener spectra, making use of the following equation:

$$DQE(\nu) = S_o^2 \times MTF(\nu)/NPS(\nu)/Q_o$$

wherein $S_o$ is the average signal in the flat-field image, MTF is the modulation transfer function, NPS is the noise power or Wiener spectrum and $Q_o$ is the X-ray dose in number of quanta per mm² used to produce the flat-field image, ν expressing the frequency for which DQE is calculated.

The term "flat=field" should be understood as "uniformly exposed", i.e. exposed with a constant intensity and with a homogeneous energy distribution in order to avoid "phantoms".

$DQE2_{rel}$ is the ratio of the DQE2 obtained at a dose of 22 mR to the DQE2 obtained at a dose of 3 mR and is expressed as:

$$DQE2rel = DQE2(22 \text{ mR})/DQE2(3 \text{ mR})$$

and is representative for the amount of screen-structure noise produced by the CR plate in the complete spatial frequency range.

In a standard procedure for mammographic applications use is made from ISO 9326-3 (beam quality I: Mo/Mo 28 kV 2.1 mm Al external filter; HVL=0.63 mm Al).

With respect to the phosphor grains or particles "$d_{99}$" expresses a grain size limit above which not more than 1% by weight of phosphor powder particles is present as derived from a phosphor weight distribution.

DETAILED DESCRIPTION OF THE INVENTION

Figure 1:
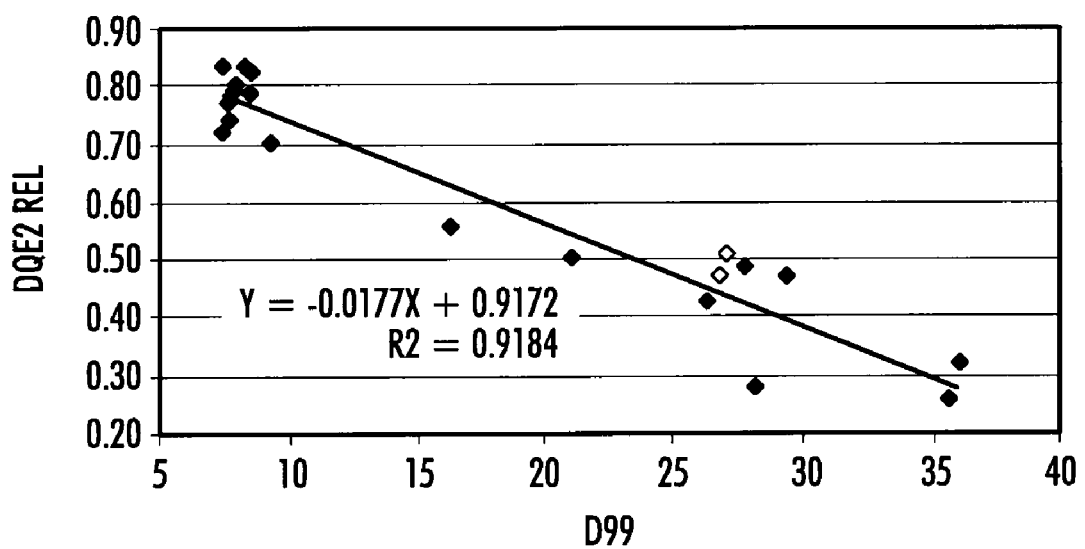
FIG. 1 shows the relation (expressed as correlation factor R) between screen structure noise parameter $DQE2_{rel}$ and $d_{99}$, representing the grain size limit within the phosphor grain size distribution, above which not more than 1% by weight of the phosphor grains are present in the phosphor grain population.

Pixel to pixel sensitivity variations in the phosphor screen are known to be the basis of screen-structure noise. Sensitivity fluctuations may be caused by fluctuations in phosphor layer thickness. For a powder phosphor layer applied by, e.g., doctor-blade coating, the phosphor layer thickness varies over a large distance. Therefore thickness fluctuations give rise to long-distance density variations in the X-ray image and not to noise in the visible range. High frequency/small distance sensitivity variations may be caused by fluctuations in the packing density of the phosphor particles. Phosphor material volume differs from pixel to pixel and also the scattering properties may fluctuate from pixel to pixel.

Research has been carried out in order to find out the influence of the phosphor particle size distribution on the fluctuation in phosphor packing density and, therefore, on the amount of screen structure noise in mammographic images made with those phosphor screens.

It has now surprisingly been found that screen-structure noise is not primarily determined by the phosphor median particle size. A very good correlation however was found between the $d_{99}$ of the phosphor particle size distribution and the amount of screen-structure noise. This means that the largest particle are responsible for the largest variations in the phosphor layer sensitivity. The larger the largest phosphor particles in the distribution are, the larger are the sensitivity variations, and, therefore, the larger is the amount of screen-structure noise. That screen structure noise is quantified by its $DQE2_{rel}$ value. $DQE2_{rel}$ expresses the amount of screen-structure noise at 2 lp/mm, but it is representative for the amount of screen-structure noise in the complete spatial frequency range.

Image quality in mammo conditions was measured for the screens incorporating the example fine particle size mammo phosphor samples. A Siemens Mammomat Nova 1000 with Mo internal filtering was used for exposures of the screens to be investigated. An external filtering with an aluminum filter having a thickness of 2.1 mm was added (HVL =0.63 mm Al). The distance to the source detector was 1 m.

For image read-out use was made of an Agfa CR75 scanner with a 50 μm pixel size and speed class setting SC100.

The technical image quality was determined by measuring the modulation transfer function, MTF, and the noise power spectrum, NPS, or Wiener spectrum, in close approximation to the methods described in the IEC-62220-1 standard. From the MTF and the Wiener spectrum, the DQE was calculated by making use of the following equation:

$$DQE(v)=S_o^2 \times MTF(v)/NPS(v)/Q_o$$

wherein $S_o$ is the average signal in the flat-field image, MTF is the modulation transfer function, NPS is the noise power or Wiener spectrum and $Q_o$ is the X-ray dose in number of quanta per mm² used to make the flat-field image.

For MTF measurement a 127 μm tungsten edge was imaged. The edge spread function was obtained from a slanted edge image and was used to calculate the MTF by making use of the algorithms described in the IEC62220-1 standard. Reading of the article "Accuracy of a simple method for deriving the presampled modulation transfer function of a digital radiographic system from an edge image", Med. Phys. 30(9), 2323-2331, 2003; is recommended as a reference closely related with that subject.

For Wiener spectrum measurement, flat-field images were made. Next, the Wiener spectrum was calculated following the methods described in the IEC 62220-1 standard.

For each screen, the DQE was measured at two different doses: 3 mR and 22 mR. Next the relative DQE at 2 lp/mm, $DQE2_{rel}$, was obtained from following calculation:

$$DQE2_{rel}=DQE(2 \text{ lp/mm}) \text{ at } 22 \text{ mR}/DQE(2 \text{ lp/mm}) \text{ at } 3 \text{ mR}.$$

Since the DQE drops with increasing dose because of the presence of screen-structure noise, $DQE2_{rel}$ is an excellent measure of the amount of screen-structure noise in the flat-field image. The higher the amount of screen-structure noise, the lower $DQE2_{rel}$. A higher value of $DQE2_{rel}$ should thus be the goal.

It has been found now that the amount of screen-structure noise reaches an acceptable level when $d_{99}$ is smaller than 15 μm, and, more preferably, when said $d_{99}$ is smaller than 10 μm.

In literature concerning phosphors as set forth above in the background of the present invention, there is hardly referred to grain size and grain size distribution of the phosphors. However, for the improvement of image quality when a phosphor is used in a radiographic image conversion panel, independent on the fact whether it is a prompt emitting or a photostimulable storage phosphor panel, control of the phosphor grain size and grain size distribution to be used is highly desired, as well as simultaneous control of the grain shape. In the present invention it has been found that the grain size and the grain size distribution are factors having a significant influence on the image quality when the phosphor is used in a radiographic image storage panel and more particularly on the screen-structure noise contribution to the image quality. More particularly finding proper ranges for the grain size and the grain size distribution has been achieved.

According to the present invention a photostimulable storage phosphor screen or panel is provided, wherein said screen comprises storage phosphor particles dispersed in a binder, wherein said particles have a particle size distribution having a $d_{99}$ which is not more than 15 μm, said $d_{99}$ expressing a grain size limit above which not more than 1% by weight of phosphor powder particles is present in said phosphor powder, and which is characterized in that its structure noise parameter $DQE2_{rel}$ exceeds a value of 0.70 and in that a ratio of $d_{99}$ (expressed in μm) and $DQE2_{rel}$ is not more than 25:1, wherein $DQE2_{rel}$ is the ratio of the DQE2 obtained at a dose of 22 mR to the DQE2 obtained at a dose of 3 mR, as expressed in formula (I)

$$DQE2_{rel}=DQE2(22 \text{ mR})/DQE2(3 \text{ mR}) \qquad (I),$$

being representative for an amount of screen-structure noise produced by said screen or panel in the complete spatial frequency range.

According to a preferred embodiment in the present invention in said photostimulable storage phosphor screen or panel said $d_{99}$ is not more than 10 μm, and its ratio of $d_{99}$ and $DQE2_{rel}$ is not more than 15:1.

According to an even more preferred embodiment in the present invention in said photostimulable storage phosphor screen or panel said $d_{99}$ is in the range from 5 μm up to less than 10 μm.

Further according to the present invention in said photostimulable storage phosphor screen or panel, a storage phosphor powder dispersed therein has a median particle size in its weight particle size distribution which is larger than 2 μm.

In another embodiment according to the present invention in said photostimulable storage phosphor screen or panel, a storage phosphor powder dispersed therein has a median particle size in its weight particle size distribution which is larger than 4 μm.

In still another embodiment according to the present invention in said photostimulable storage phosphor screen or panel, a storage phosphor powder dispersed therein has a median particle size in its weight particle size distribution which is larger than 6 μm.

A photostimulable storage phosphor screen or panel according to the present invention preferably has, as a storage phosphor a lanthanide activated alkaline earth metal fluoro halide type phosphor.

So a photostimulable storage phosphor screen or panel according to the present invention preferably has as a storage phosphor a BaFBr:Eu-type phosphor. In a particular embodiment thereof said phosphor is a Ba(Sr)FBr:Eu-type phosphor.

In another embodiment of the present invention a photostimulable storage phosphor screen or panel has as a storage phosphor a $(Ba,Sr)F_{1+x}X_{1-x}$ phosphor, wherein $0<x<0.1$ and wherein X is one of Br or I or a combination thereof.

In a screen or panel according to the present invention a storage phosphor used therein is advantageously prepared by a method comprising multiple firing steps and multiple milling steps, each firing step being followed by a milling step, and wherein each of said milling steps are performed in a continuous milling procedure, characterised in that at least said last milling procedure is performed at a milling rate higher than the former milling procedures.

As a final step after a last thermal treatment step a last milling step is advantageously performed at a milling rate of not less than 8000 rpm further according to the method of the present invention said last milling step is performed by air-jet milling, i.e., preferably performed in an air-jet mill.

Examples of the shape of powdery grains may include a rectangular parallelopipedon, a regular hexahedron, a regular octahedron, a tetradecahedron or a polyhedron as a general shape. However, the phosphor is not necessarily limited thereto, because any phosphor, which fulfills the requirements with respect to grain weight and grain weight distribution of the grain or particle population advantageously achieves the effects of the present invention. In the steps before starting firing procedures, it is not excluded to make use of precipitation techniques as known from U.S. Pat. Nos. 6,531,073 and 6,638,447; from published US-Application 2006/108565 or from PCT-Application WO 2006/54532.

The stimulable phosphor layer may be formed on a support by a known method given below. First, a stimulable phosphor and a binder are added into a solvent, and these substances are well mixed to thereby prepare a coating liquid having the stimulable phosphor uniformly dispersed in the binder solution. Although the ratio between binder and stimulable phosphor may vary depending on the desired characteristics of the radiographic image storage panel, the type of stimulable phosphor, and other factors, the weight ratio of binder to stimulable phosphor is generally selected from a range of from 1:1 to 1:100 and more preferably from a range of from 1:8 to 1:40. The coating liquid containing the stimulable phosphor and the binder, is then coated uniformly on the surface of a support to thereby form a coating film. This coating operation may be performed by using a conventional coating means such as a doctor blade, a roll coater and a knife coater, without however being limited thereto.

The support may be optionally selected from the materials known as suitable for use as supports of radiographic image conversion panels. Support materials for radiographic screens which in accordance with specific embodiments of the present invention may be, apart from the plastic films such as films of cellulose acetate, polyvinyl chloride, polyvinyl acetate, polyacrylonitrile, polystyrene, polyester, polyethylene terephthalate, polyethylene naphthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. As already set forth before preferred supports include polyethylene terephthalate, clear or blue colored or black colored (e.g., LUMIRROR C, type X30 supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having the desired radiation-reflective properties, required for supports having reflective properties in favor of speed. These supports may have thicknesses which may differ depending on the material of the support, and may generally be between 50 and 1000 μm, more preferably between 80 and 500 μm depending on handling properties. Further may be mentioned glass supports. In conventional radiographic image conversion panels, an adhesion promoting substrate layer is provided by coating a polymeric substance on the support surface on the side, whereupon the stimulable phosphor layer should be coated, in order to strengthen the bond between support and stimulable phosphor. In order to improve sensitivity or image quality (sharpness, granularity), coating of a light-reflective layer comprised of a light-reflective substance such as titanium dioxide or a light-absorptive layer comprised of a light-absorptive substance such as carbon black or a pigmented layer, between phosphor and substrate is known as state of the art, as has e.g. been described in U.S. Pat. No. 6,927,404. Therein the image storage panel has a supported layer of storage phosphor particles dispersed in a binding medium, and adjacent thereto, between the layer and a support having reflective properties, a layer arrangement of intermediate layers inbetween the layer and the support: the particularly suitable layer arrangement consists of an antihalation undercoat layer containing one or more dye(s), the layer being situated more close to the support, and an adhesion improving layer situated more close to the layer of storage phosphor particles, and wherein the adhesion improving layer is hardened to a lesser extent than the antihalation undercoat layer. So in order to enhance the sharpness of the images to be obtained after reading out the storage phosphor panel, at least one layer of the layers constituting the radiographic image conversion panel may thus be colored with a colorant which absorbs exciting light but does not absorb stimulable emission, wherein an independent colored intermediate layer may be provided as described in the said U.S. Pat. No. 6,927,404.

Furtheron fine irregularities may be formed on the support surface of the phosphor layer side for the purpose of increasing the sharpness of the image to be obtained.

In a particular embodiment a radiation image storage panel comprises a self-supporting or supported layer of storage phosphor particles dispersed in a binding medium and, adjacent thereto, a protective coating characterized in that, besides a binder, the said protective coating comprises a white pigment having a refractive index of more than 1.6, which is present in the said binder, preferably further comprising a urethane acrylate, and wherein said protective coating has a surface roughness (Rz) between 2 and 10 μm as disclosed in U.S. Pat. No. 6,815,092. In that invention an image storage panel having high surface durability has been provided, i.a. avoiding damaging of the surface by stain and abrasion after multiple use, further in favor of ease of manipulation, excellent image quality (improved sharpness) without screen structure noise increase.

The coating film thus formed on the support is dried to thereby form a stimulable phosphor layer on the support. The thickness of the stimulable phosphor layer is normally in the range from 20 μm to 1 mm, although it may vary depending on the desired characteristics of the radiographic image storage panel, the type of the stimulable phosphor, the ratio between binder and stimulable phosphor, and other factors, such as the application for which the screen is intended.

Preferably, the thickness of the stimulable phosphor layer is 50 to 500 μm. The stimulable phosphor layer is not necessarily formed on the support as described above: a phosphor layer may e.g. be formed on a separate sheet, such as a glass sheet, a metal sheet, a plastic sheet, or the like by coating the coating liquid and thereafter drying the coated layer and the phosphor layer thus obtained may be adhered to a dedicated support by, pressure or by use of an adhesive.

A protective film is further provided on the stimulable phosphor layer. Examples of that protective film may include a film formed by coating a solution, which is prepared by dissolving a transparent organic polymer such as a cellulose derivative, polymethyl methacrylate on the stimulable phosphor layer, a film formed by applying a protective film forming sheet, which is prepared separately and which is an organic polymer film such as e.g. polyethylene terephthalate or a transparent glass plate, without however being limitative, to the stimulable phosphor layer by using a suitable adhesive. In another embodiment a film of an organic or inorganic compound formed by, for example, vapor deposition on the stimulable phosphor layer may also be formed, such as e.g. a para-xylylene film. In still another embodiment the protective film may be a film formed by coating a fluorocarbon resin soluble in an organic solvent, containing a perfluoro-olefinic resin powder or a silicone resin powder dispersed therein.

According to any one of the processes described above, it is possible to prepare a radiographic image conversion panel comprising a support and a stimulable phosphor layer, which comprises a stimulable phosphor and a binder holding the stimulable phosphor in a dispersed state thereof, provided on the support, in which the stimulable phosphor has a particle or grain size distribution, with a $d_{99}$ which is not more than 15 µm, said $d_{99}$ expressing a grain size limit above which not more than 1% by weight of phosphor grains is present in said phosphor powder.

EXAMPLES

While the present invention will hereinafter be described in connection with preferred embodiments thereof, it will be understood that it is not intended to limit the invention to those embodiments.

Preparation of the photostimulable phosphors of the present invention besides comparative phosphor samples was performed as follows.

$Ba_{0.859}Sr_{0.14}Eu_{0.01}F_2$ was prepared by adiabatic reaction of the appropriate amounts of $BaCO_3$, $SrCO_3$ and $Eu_2O_3$ in an aqueous dispersion with HF.

A raw mix was made by thoroughly mixing the following ingredients in the following proportions:

| | |
|---|---|
| $Ba_{0.859}Sr_{0.14}Eu_{0.01}F_2$: | 0.528 mole |
| $BaBr_2$: | 0.375 mole |
| $BaI_2$: | 0.095 mole |
| $NH_4Br$: | 0.045 mole |
| CsI: | 0.003 mole |
| $PbF_2$: | 0.0003 mole |
| $Sm_2O_3$: | 0.00025 mole |
| $Eu_2O_3$: | 0.00072 mole |

The phosphor was made in 2 firing steps:

First Firing Step:

Three crucibles, each containing 165 g of raw mix were placed in a quartz tube, which was sealed with a flange having a gas inlet and a gas outlet with waler lock. After flushing with $N_2$ for 15 minutes, the quartz tube was placed in a box furnace at 850° C. Dwell time in the furnace was 2 hours and the tube was flushed with $N_2$ at 1.5 l/min.

After that firing the tube was taken out of the furnace and left to cool for 30 minutes while being flushed with $N_2$. Next, the crucibles were taken out of the tube and the powder was deagglomerated with mortar and pestle.

The deagglomerated powder was milled on an Alpine AFG-100 air mill with three 3 mm nozzles, a milling chamber pressure of 3 bar and a wheel rotation rate of 3,500 r.p.m.

Second Firing Step:

Three crucibles containing 230 g of first fired material each, were placed in a quartz tube, which was sealed with a flange having a gas inlet and a gas outlet with water lock. The quartz tube was immediately placed in a box furnace at 725° C. Dwell time in the furnace was 5.5 hours and the tube was flushed with $N_2$ at 1.5 l/min.

After that firing the tube was allowed to cool in the furnace to 450° C. while being flushed with $N_2$. Next, the tube was opened, taken out of the furnace and allowed to cool further for 30'. The crucibles were taken out of the tube and the powder was deagglomerated with mortar and pestle.

The deagglomerated powder was milled again on an Alpine AFG-100 air mill with three 3 mm nozzles, a milling chamber pressure of 3 bar and a wheel rotation rate of 3,500 r.p.m.

Phosphors prepared in the above described way were used as starting material in order to prepare the fine mammo inventive example and comparative example phosphor samples.

The fine phosphors were made by remilling (3rd milling), refiring in the same way as in the second firing and remilling (4th milling) on the Alpine AFG-100 air-jet mill.

3rd and 4th milling rates and procedures are given below, together with the resulting $d_{99}$ of the phosphors in the Table 1 hereinafter.

TABLE 1

| Phosphor | 3-rd milling rate | 4-th milling rate | Milling procedure | $d_{99}$ (µm) | $DQE(2)_{rel}$ |
|---|---|---|---|---|---|
| Inv. ex. 1 | 7000 | 9000 | continuous milling | 9.29 | 0.70 |
| Inv. ex. 2 | 9000 | 10000 | continuous milling | 8.54 | 0.79 |
| Inv. ex. 3 | 7000 | 10500 | continuous milling | 8.28 | 0.83 |
| Inv. ex. 4 | 10000 | 10500 | continuous milling | 7.35 | 0.84 |
| Inv. ex. 5 | 9500 | 10500 | continuous milling | 7.99 | 0.79 |
| Inv. ex. 6 | 9500 | 10500 | continuous milling | 8.45 | 0.82 |
| Inv. ex. 7 | 9500 | 10500 | continuous milling | 7.61 | 0.75 |
| Inv. ex. 8 | 6000 | 10500 | continuous milling | | 0.80 |
| Inv. ex. 9 | 9500 | 10500 | continuous milling | 7.56 | 0.77 |
| Inv. ex. 10 | 10000 | 10500 | continuous milling | 7.47 | 0.72 |
| Inv. ex. 11 | 10000 | 10500 | continuous milling | 7.84 | 0.81 |
| Comp. ex. 12 | 14000 | 3000 | batch milling | 26.79 | 0.47 |
| Comp. ex. 13 | 14000 | 3000 | batch milling | 26.53 | 0.48 |
| Comp. ex. 14 | 3000 | 6000 | batch milling | 29.34 | 0.48 |
| Comp. ex. 15 | 3000 | 7000 | batch milling | 26.26 | 0.43 |
| Comp. ex. 16 | 3500 | 3500 | batch milling | 36.07 | 0.32 |
| Comp. ex. 17 | 3500 | 6500 | batch milling | 28.02 | 0.28 |
| Comp. ex. 18 | 6500 | 3500 | batch milling | 27.65 | 0.48 |
| Comp. ex. 19 | 3500 | 6000 | batch milling | 20.96 | 0.50 |
| Comp. ex. 20 | 3500 | 3500 | batch milling | 35.48 | 0.26 |
| Comp. ex. 21 | Filter dust | 5600 | continuous milling | 16.23 | 0.56 |

The grain or particle size distribution of the phosphors was measured by means of a laser diffraction technique. The classical optical set-up for particle-light interaction was used and referred to as Fourier-optics.

The phosphor to be measured was dispersed in turbulent air with a pressure of 0.5 bar by means of a Sympatec RODOS/VIBRI dispersion and dosing system in the measuring zone of a Sympatec HELOS laser diffraction system. Therein the dispersed particles interact with the laser light in the parallel laser beam of the He—Ne laser. The diffraction patterns are collected on a semicircular 31 channel detector. With this input information the particle size distribution is deconvoluted using Fraunhofer theory by making use of the HRLD mode of the Sympated WINDOX operation contol software system.

The particle size distribution was plotted as $Q(x)$ as a function of particle size, where Q was representing the volume or weight of particles with a size (x). For each measurement X10, X25, X50, X75, X90 and X99 were determined: X10 to X99 refer to the value of the particle size on the cumulative distribution curve corresponding with 10% and 99% of the total weight of measured particles, respectively. E.g. this means for X10: 10% of the particles having a particle size smaller than the particle size expressed by the value of X10 make up 10% by weight of the complete phosphor powder.

It is clear from the Table 1 hereinbefore that continuous milling leads to superior results with respect to $d_{99}$ if compared with batch milling procedures. Lowest values for the $d_{99}$ limit are moreover found for the highest milling rates in the last milling step. Highest values of $DQE(2)_{rel}$ are clearly found for the lowest $d_{99}$ limit.

The final fine particle size powders were separately dispersed in a binder solution (see phosphor layer composition hereinafter).

| Phosphor layer composition: | |
|---|---|
| STANN JF95B (from SANKYO ORGANIC Chemicals Co. Ltd.) | 0.45 g |
| KRATON FG19101X (from Shell Chemicals) | 6.25 g |
| BaSrFBr:Eu | 150 g |

Preparation of the Phosphor Lacquer Composition:

STANN JF95B and KRATON FG19101X were dissolved while stirring in the prescribed amounts in 41.65 g of a solvent mixture from methylcyclohexane, toluene and butyl acetate in ratios by volume of 50:35:15. The phosphors were added thereafter and stirring was further proceeded for another 10 minutes at a rate of 1700 r.p.m. Then the phosphor lacquer was given a ball-mill treatment during 1 min at 1700 r.p.m.

The composition was doctor blade coated at a coating rate of 2.5 m per minute and a thickness of 600 μm onto a subbed 175 μm thick polyethylene terephthalate support and dried at room temperature during 30 minutes. In order to remove volatile solvents as much as possible the coated phosphor plate was dried at 60° C. in a drying furnace.

The screen-structure noise measure, $DQE2_{rel}$ was plotted vs. $d_{50}$, $d_{90}$ and $d_{99}$ of the particle size distribution for a large number of phosphor powders (see FIG. 1: expressing the relation between screen structure noise values and $d_{50}$, $d_{90}$ and $d_{99}$ respectively, representing grain size limits within the phosphor grain size distribution above which not more than 50%, 10% and 1% by weight of the phosphor grains respectively are present in the phosphor grain population.

It is clear from those data, graphically represented in the FIG. 1, that the amount of screen-structure noise correlates much better with $d_{90}$ of the particle size distribution than with $d_{50}$ and that the correlation with $d_{99}$ is even better as is clear from the correlation factor R.

Some of the investigated samples have a low $d_{50}$, but lead to a large amount of screen-structure noise: this means that those samples combine a low $d_{50}$ with a high $d_{90}$ and $d_{99}$ (see e.g. thicker black points in the graphs in FIG. 1). This observation implies that a very small number of coarse particles in the phosphor powder is responsible for the inhomogeneity of the plate response. It is clear that in order to reduce screen-structure noise in the plate $d_{99}$ must be smaller than 15 μm and preferably smaller than 10 μm.

As a particularly advantageous effect of the present invention it has thus been found that, to keep screen-structure noise low, it is not necessary to have a low median particle size $d_{50}$: it is, as a primary condition required to reduce the amount of coarse particles and/or agglomerates, i.e. to have a low $d_{90}$ and, more particularly a low $d_{99}$. The object to attain an improved screen-structure noise has thus fully been attained by preparing phosphors free from coarse primary particles or agglomerates.

Figure 2A:
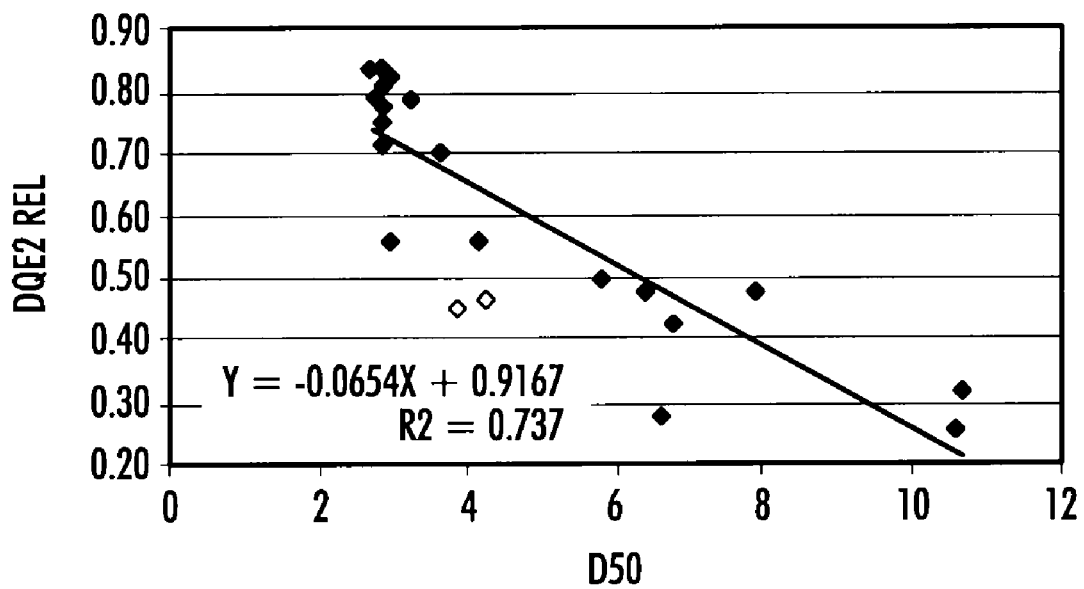
FIGS. 2A and B show the relation (expressed as correlation factor R) between screen structure noise parameter $DQE2_{rel}$ and $d_{50}$ and $d_{90}$ respectively, representing the grain size limits within the phosphor grain size distribution, above which not more than 50% and 10% by weight of the phosphor grains are respectively present in the phosphor grain population.
Figure 2B:
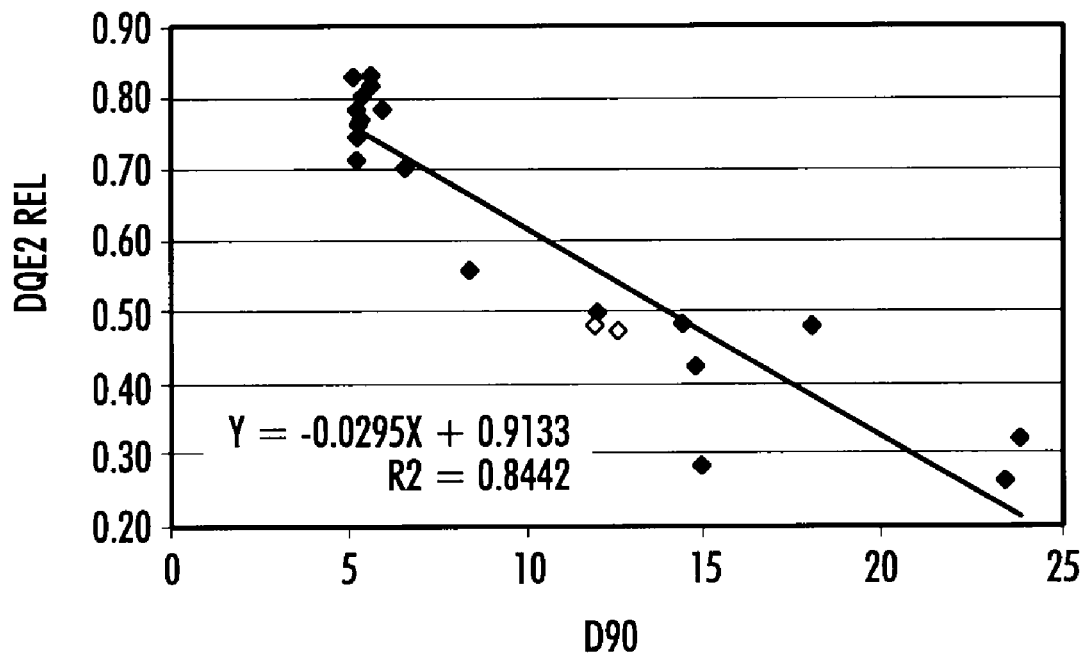

A lowered homogeneity of the screen, reflected by decreased DQE values, becomes more important at high doses. The higher the screen-structure, the more the DQE decreases with an increasing dose. Decrease in DQE with increasing dose can be quantified by making the ratio of the DQE at 2 line pairs at a lower dose (3 mR) to the DQE at a higher dose (33 mR). The ratio is calculated for each phosphor and is displayed as a function of the grain size in FIGS. 2A and 2B. FIGS. 2A and 2B show the relation (expressed as correlation factor R) between screen structure noise parameter $DQE2_{rel}$ and $d_{50}$ and $d_{90}$ respectively, representing grain size values within the phosphor grain size distribution, above which not more than 50% and 10% by weight of the phosphor grains are present respectively in the phosphor grain population. As can be concluded from all of the correlation factors R calculated from those graphs, a very good correlation is found between screen structure noise parameter $DQE2_{rel}$ and grain size limits respectively, wherein a good correlation with the highest grain size limit (99% by weight) is most important.

Having described in detail preferred embodiments of the current invention, it will now be apparent to those skilled in the art that numerous modifications can be made therein without departing from the scope of the invention as defined in the appending claims.

What is claimed is:

1. Method of preparing a photostimulable storage phosphor screen or panel wherein said screen or panel comprises storage phosphor particles dispersed in a binder, wherein said particles have a particle size distribution having a $d_{99}$ which is not more than 15 μm, said $d_{99}$ expressing a grain size limit above which not more than 1% by weight of phosphor powder particles is present in said phosphor powder, wherein its structure noise parameter $DQE2_{rel}$ exceeds a value of 0.70 and wherein a ratio of $d_{99}$ (expressed in μm) to $DQE2_{rel}$ is not more than 25:1, $DQE2_{rel}$ being the ratio of the DQE2 obtained at a dose of 22 mR to the DQE2 obtained at a dose of 3 mR, as expressed in formula (I)

$$DQE2_{rel} = DQE2(22 \text{ mR}))/DQE2(3 \text{ mR}) \qquad (I)$$

which is representative for an amount of screen-structure noise produced by said screen or panel in the complete spatial frequency range comprising multiple firing steps and multiple milling steps, each firing step being followed by a milling step, and wherein each of said milling steps are performed in a continuous milling procedure, characterised in that at least said last milling procedure is performed at a milling rate higher than the former milling procedures.

2. Method according to claim 1, wherein said last milling step is performed at a milling rate of not less than 8000 rpm.

3. Method according to claim 1, wherein said last milling step is performed by air-jet milling.

* * * * *

UNITED STATES PATENT AND TRADEMARK OFFICE
CERTIFICATE OF CORRECTION

PATENT NO.        : 7,446,323 B2  
APPLICATION NO.   : 11/511923  
DATED             : November 4, 2008  
INVENTOR(S)       : Leblans et al.

Page 1 of 1

It is certified that error appears in the above-identified patent and that said Letters Patent is hereby corrected as shown below:

On the title page item (73), change  
Assignee: Agfa-Gevaert, Mortsel (BE)  
to  
Assignee: Agfa Healthcare, Mortsel (BE)

Signed and Sealed this

Seventh Day of April, 2009

JOHN DOLL  
*Acting Director of the United States Patent and Trademark Office*